United States Patent
Wollrath et al.

(10) Patent No.: US 6,237,024 B1
(45) Date of Patent: May 22, 2001

(54) METHOD AND APPARATUS FOR THE SUSPENSION AND CONTINUATION OF REMOTE PROCESSES

(75) Inventors: Ann M. Wollrath, Groton; Kenneth C. R. C. Arnold, Lexington, both of MA (US)

(73) Assignee: Sun Microsystem, Inc., Palo Alto, CA (US)

( * ) Notice: Subject to any disclaimer, the term of this patent is extended or adjusted under 35 U.S.C. 154(b) by 0 days.

(21) Appl. No.: 09/044,917

(22) Filed: Mar. 20, 1998

(51) Int. Cl.⁷ .................................................... G06F 13/38

(52) U.S. Cl. ............................................ 709/203; 709/224

(58) Field of Search .................................... 709/238, 159, 709/201, 227, 213, 220, 203, 224; 395/608, 700, 650, 2.42, 610; 370/468, 58; 707/103, 4; 364/559; 713/201; 379/201; 703/23

(56) References Cited

U.S. PATENT DOCUMENTS

| | | |
|---|---|---|
| 4,491,946 | 1/1985 | Kryskow, Jr. et al. . |
| 4,713,806 | * 12/1987 | Oberlander et al. .................. 370/58 |
| 4,809,160 | 2/1989 | Mahon et al. . |
| 4,823,122 | 4/1989 | Mann et al. . |
| 4,939,638 | 7/1990 | Stephenson et al. . |
| 4,956,773 | 9/1990 | Saito et al. . |
| 5,088,036 | 2/1992 | Ellis et al. ........................... 395/425 |
| 5,109,486 | 4/1992 | Seymour . |
| 5,187,787 | 2/1993 | Skeen et al. ......................... 395/600 |
| 5,218,699 | 6/1993 | Brandle et al. . |
| 5,257,369 | 10/1993 | Skeen et al. ......................... 395/650 |
| 5,293,614 | 3/1994 | Ferguson et al. .................... 395/600 |
| 5,297,283 | 3/1994 | Kelly, Jr. et al. . |
| 5,311,591 | 5/1994 | Fischer . |

(List continued on next page.)

FOREIGN PATENT DOCUMENTS

| | | |
|---|---|---|
| 0 300 516 A2 | 1/1989 | (EP) . |
| 0 351 536 A3 | 1/1990 | (EP) . |
| 0 384 339 A3 | 2/1990 | (EP) . .................................. (WO) . |

(List continued on next page.)

OTHER PUBLICATIONS

Howard et al., Scale and Performance in a Distributed File System, ACM Transactions on Computer Systems, vol. 6, No. 1, Feb. 1988, pp. 51–81.

Cardelli, Obliq, A lightweight language for network objects, Nov. 5, 1993, pp. 1–37.

Dijkstra, Self–stabilizing Systems in Spite of Distributed Control, Communications of the ACM, vol. 17, No. 11, Nov. 1974, pp. 643–644.

(List continued on next page.)

*Primary Examiner*—Le Hien Luu
*Assistant Examiner*—Thong Vu
(74) *Attorney, Agent, or Firm*—Finnegan, Henderson, Farabow, Garrett & Dunner, L.L.P.

(57) ABSTRACT

A method and apparatus is provided for enabling blocked remote methods to relinquish threads and other resources to other methods on a server system. In a distributed computing environment, remote methods are allocated numerous network resources but are blocked while they wait for operations, such as a write operation from another process, to complete. When enough remote methods are blocked, threads and other network resources may run out. Client systems requesting server services may experience slower response times. This method and system provides a technique for remote methods to relinquish network resources, such as threads, for other methods to use while the methods are blocked. Once the conditions causing the remote methods to block is resolved, the remote methods continue execution. This technique enables high volume client-server transaction systems to utilize threads and other resources in a distributed computing environment more efficiently.

39 Claims, 7 Drawing Sheets

U.S. PATENT DOCUMENTS

| | | | |
|---|---|---|---|
| 5,339,435 | * | 8/1994 | Lubkin et al. ............... 395/700 |
| 5,386,568 | | 1/1995 | Wold et al. . |
| 5,390,328 | | 2/1995 | Frey et al. . |
| 5,423,042 | | 6/1995 | Jalili et al. . |
| 5,440,744 | * | 8/1995 | Jacobson et al. ............ 395/650 |
| 5,448,740 | | 9/1995 | Kiri et al. . |
| 5,455,952 | | 10/1995 | Gjovaag . |
| 5,471,629 | | 11/1995 | Risch . |
| 5,475,792 | * | 12/1995 | Stanford et al. ............ 395/2.42 |
| 5,475,817 | | 12/1995 | Waldo et al. . |
| 5,481,721 | | 1/1996 | Serlet et al. . |
| 5,504,921 | | 4/1996 | Dev et al. . |
| 5,511,197 | | 4/1996 | Hill et al. . |
| 5,524,244 | | 6/1996 | Robinson et al. . |
| 5,553,282 | | 9/1996 | Parrish et al. . |
| 5,555,367 | | 9/1996 | Premerlani et al. . |
| 5,557,798 | | 9/1996 | Skeen et al. ............... 395/650 |
| 5,560,003 | | 9/1996 | Nilsen et al. ............... 395/600 |
| 5,561,785 | | 10/1996 | Blandy et al. ............ 395/497.01 |
| 5,577,231 | | 11/1996 | Scalzi et al. . |
| 5,603,031 | | 2/1997 | White et al. ............... 395/683 |
| 5,617,537 | | 4/1997 | Yamada et al. . |
| 5,628,005 | * | 5/1997 | Hurvig ....................... 395/608 |
| 5,640,564 | | 6/1997 | Hamilton et al. . |
| 5,652,888 | | 7/1997 | Burgess . |
| 5,655,148 | | 8/1997 | Richman et al. ........... 395/828 |
| 5,659,751 | | 8/1997 | Heninger ................... 395/685 |
| 5,671,225 | * | 9/1997 | Hooper et al. ............. 370/468 |
| 5,675,796 | * | 10/1997 | Hodges et al. ............ 709/159 |
| 5,680,573 | | 10/1997 | Rubin et al. . |
| 5,680,617 | | 10/1997 | Gough et al. . |
| 5,684,955 | | 11/1997 | Meyer et al. . |
| 5,689,709 | | 11/1997 | Corbett et al. . |
| 5,699,531 | | 12/1997 | Skeen et al. . |
| 5,706,435 | | 1/1998 | Barbar' et al. . |
| 5,706,502 | * | 1/1998 | Foley et al. ................ 395/610 |
| 5,724,588 | | 3/1998 | Hill et al. . |
| 5,727,145 | | 3/1998 | Nessett et al. . |
| 5,737,607 | | 4/1998 | Hamilton et al. . |
| 5,745,678 | | 4/1998 | Herzberg et al. . |
| 5,745,695 | * | 4/1998 | Gilchrist et al. ........... 709/227 |
| 5,745,703 | * | 4/1998 | Cetjin et al. ............... 709/238 |
| 5,754,849 | | 5/1998 | Dyer et al. . |
| 5,757,925 | | 5/1998 | Faybishenko . |
| 5,761,656 | | 6/1998 | Ben-Shacher . |
| 5,764,897 | | 6/1998 | Khalidi . |
| 5,768,532 | | 6/1998 | Megerian . |
| 5,774,551 | | 6/1998 | Wu et al. . |
| 5,778,228 | | 7/1998 | Wei . |
| 5,778,368 | | 7/1998 | Hogan et al. . |
| 5,787,425 | | 7/1998 | Bigus . |
| 5,787,431 | | 7/1998 | Shaughnessy . |
| 5,808,911 | * | 9/1998 | Tucker et al. .............. 364/559 |
| 5,809,507 | | 9/1998 | Cavanaugh, III . |
| 5,813,013 | | 9/1998 | Shakib et al. . |
| 5,815,149 | | 9/1998 | Mutschler, III et al. . |
| 5,815,709 | | 9/1998 | Waldo et al. . |
| 5,815,711 | | 9/1998 | Sakamoto et al. . |
| 5,829,022 | | 10/1998 | Watanabe et al. . |
| 5,832,529 | | 11/1998 | Wollrath et al. . |
| 5,832,593 | | 11/1998 | Wurst et al. . |
| 5,835,737 | | 11/1998 | Sand et al. . |
| 5,842,018 | | 11/1998 | Atkinson et al. . |
| 5,844,553 | | 12/1998 | Hao et al. . |
| 5,845,129 | | 12/1998 | Wendorf et al. . |
| 5,860,004 | | 1/1999 | Fowlow et al. . |
| 5,860,153 | | 1/1999 | Matena et al. . |
| 5,864,862 | | 1/1999 | Kriens et al. . |
| 5,864,866 | | 1/1999 | Henckel et al. . |
| 5,872,928 | | 2/1999 | Lewis et al. . |
| 5,875,335 | | 2/1999 | Beard . |
| 5,878,411 | | 3/1999 | Burroughs et al. . |
| 5,884,079 | | 3/1999 | Furusawa . |
| 5,887,134 | * | 3/1999 | Ebrahim ..................... 709/201 |
| 5,890,158 | | 3/1999 | House et al. . |
| 5,892,904 | | 4/1999 | Atkinson et al. . |
| 5,899,990 | * | 5/1999 | Maritzen et al. ........... 707/4 |
| 5,933,497 | | 8/1999 | Beetcher et al. . |
| 5,935,249 | * | 8/1999 | Stern et al. ................. 713/201 |
| 5,940,827 | | 8/1999 | Hapner et al. . |
| 5,944,793 | * | 8/1999 | Islam et al. ................ 709/220 |
| 5,946,485 | | 8/1999 | Weeren et al. . |
| 5,946,694 | | 8/1999 | Copeland et al. . |
| 5,987,506 | * | 11/1999 | Carter et al. ............... 709/213 |
| 5,995,744 | * | 11/1999 | Guccione ................... 703/23 |
| 6,003,763 | | 12/1999 | Gallagher et al. . |
| 6,016,496 | * | 1/2000 | Robertson ................... 707/103 |
| 6,041,111 | * | 3/2000 | Shelton ...................... 379/201 |
| 6,073,174 | * | 6/2000 | Montgomerie et al. .... 709/224 |
| 6,098,093 | * | 8/2000 | Bayeh et al. ............... 709/203 |

FOREIGN PATENT DOCUMENTS

| | | |
|---|---|---|
| 0 472 874 A1 | 3/1992 | (EP) . |
| 0 474 340 A2 | 3/1992 | (EP) . |
| 0 555 997 A2 | 8/1993 | (EP) . |
| 0 565 849 A2 | 10/1993 | (EP) . |
| 0 569 195 A3 | 11/1993 | (EP) . |
| 0 625 750 A2 | 11/1994 | (EP) . |
| 0 635 792 A2 | 1/1995 | (EP) . |
| 0 651 328 A1 | 5/1995 | (EP) . |
| 0 660 231 A2 | 6/1995 | (EP) . |
| 0 718 761 A1 | 6/1995 | (EP) . |
| 0 697 655 A2 | 2/1996 | (EP) . |
| 0 767 432 A2 | 4/1997 | (EP) . |
| 0 778 520 A2 | 6/1997 | (EP) . |
| 0 794 493 A2 | 9/1997 | (EP) . |
| 0 803 810 A2 | 10/1997 | (EP) . |
| 0 803 811 A2 | 10/1997 | (EP) . |
| 0 805 393 A2 | 11/1997 | (EP) . |
| 0 810 524 A1 | 12/1997 | (EP) . |
| 0 817 020 A2 | 1/1998 | (EP) . |
| 0 817 022 A2 | 1/1998 | (EP) . |
| 0 817 025 A2 | 1/1998 | (EP) . |
| 0 836 140 A2 | 4/1998 | (EP) . |
| 2 253 079 | 8/1992 | (GB) . |
| 2 262 825 | 6/1993 | (GB) . |
| WO 96/03692 | 2/1996 | (GB) . |
| 2 305 087 | 3/1997 | (GB) . |
| 11-45187 | 2/1999 | (JP) . |
| WO 92/07335 | 4/1992 | (WO) . |
| WO92/09948 | 6/1992 | (WO) . |
| WO94/03855 | 2/1994 | (WO) . |
| WO96/10787 | 4/1996 | (WO) . |
| WO96/18947 | 6/1996 | (WO) . |
| WO96/24099 | 8/1996 | (WO) . |
| WO98/02814 | 1/1998 | (WO) . |
| WO98/04971 | 2/1998 | |

OTHER PUBLICATIONS

Ousterhout et al., The Sprite Network Operating System, Computer, IEEE, Feb. 1988, pp. 23–36.

Dourish, A Divergence–Based Model of Synchrony and Distribution in Collaborative Systems, Xerox Technical Report EPC–1194–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

Transparent Network Computing, Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., Long Term Distributed File Reference Tracing: Implementation and Experience, Carnegie Mellon University School of Computer Science, Nov. 1994, pp. 1–28.

Gelernter et al., Parallel Programming in Linda, Yale University, Jan. 1985, pp. 1–21.

Cannon et al., Adding Fault–Tolerant Transaction Processing to Linda, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CSIE 90–019, Sep. 1990, pp. 1–16.

Anderson et al., Persistent Linda: Linda + Transactions + Query Processing, Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Carriero et al., Distributed Data Structures in Linda, Principals of Programming Language, 1986, pp. 1–16.

Pinakis, Using Linda as the Basis of an Operating System Microkernel, University of Western Australia, Department of Computer Science, Aug. 1993, pp. 1–165.

Linda Database Search, Jul. 20, 1995, pp. 1–68.

Carriero et al, Distributed Data Structures in Linda, Yale Research Report YALEU/DCS/RR–438, Nov. 1985.

Agha et al., Actorspaces: An Open Distributed Programming Paradigm, University of Illinois, Report No. UIUCDCS–R–92–1766, Open Systems Laboratory TR No. 8, Nov. 1993, pp. 1–12.

Ahmed et al., A Program Building Tool for Parallel Applications, Yale University, Dec. 1, 1993, pp. 1–23.

Liskov et al., Distributed Object Management in Thor, International Workshop on Distributed Object Management, 1992, pp. 12.

Coulouris et al., Distributed Systems Concepts and Designs, Second Edition, Addison–Wesley, 1994.

Birrell et al., Network Objects, DEC SRC Research Report 115, Feb. 28, 1994.

Birrell et al., Distributed Garbage Collection for Network Objects, DEC SRC Research Report 116, Dec. 15, 1993.

Jaworski, JAVA 1.1 Developer's Guide, Sams.net, 1997.

Wollrath et al., A Distributed Object Model for the JAVA™ System, USENIX Association, Conference on Object–Oriented Technologies and Systems, Jun. 17–21, 1996.

Harris et al., Proposal for a General Java Proxy Class for Distributed Systems and Other Uses, Netscape Communications Corp., Jun. 25, 1997.

Hamilton, Java and the Shift to Net–Centric Computing Computer, Aug. 1996, pp. 31–39.

Chung et al., A 'Tiny' Pascal Compiler: Part I: The P–Code Interpreter, BYTE Publications, Inc., Sep. 1978.

Chung et al., A 'Tiny' Pascal Compiler: Part 2: The P–Compiler, BYTE Publications, Inc., Oct. 1978.

Thompson, Regular Expression Search Algorithm, Communications of the ACM, vol. II, No. 6, p. 149 et seq., Jun. 1968.

Mitchell et al., Mesa Language Manual, Xerox Corporation.

McDaniel, An Analysis of a Mesa Instruction Set, Xerox Corporation, May 1982.

Pier, A Retrospective on the Dorado, A High–Performance Personal Computer, Xerox Corporation, Aug. 1983.

Pier, A Retrospective on the Dorado, A High–Performance Personal Computer, IEEE Conference Proceedings, The 10th Annual international Symposium on Computer Architecture, 1983.

Krasner, The Smalltalk–80 Virtual Machine, BYTE Publications Inc., Aug. 1991, pp. 300–320.

Operating Systems Review, ACM Press, vol. 27, No. 5, Dec. 1993, pp. 217–230.

Remote Method Invocation Specification, Sun Microsystems, Inc., (1997). http://java.sun.com/products/jdk/1.1/docs/guide/rmi/spec/rmiTOC.doc.html.

Alexander, et al., "Active Bridging", Proceedings of the ACM/SIGCOMM'97 Conference, Cannes, France, Sep. 1997.

Anonymous: "Change–Notification Service for Shared Files" IBM Technical Disclosure Bulletin, vol. 36, No. 8, pp. 77–82, XP002108713 New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192.

Birrell et al., "Implementing Remote Procedure Calls", ACM Transactions on Computer Systems, vol. 2, No. 1, Feb. 1984, pp. 39–59.

Dave A et al: "Proxies, Application Interface, and Distributed Systems", Proceedings International Workshop on Object Orientation in Operating Systems, Sep. 24, 1992, pp. 212–220.

Deux O et al: "The 02 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", HTTP://WWW.CIS.OHIO–STATE.EDU/HTBIN/RFC/RFC1541.HTML, Oct. 1993, pp. 1–33.

Emms J: "A Definition of an Access Control Systems Language" Computer Standards and Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort", "HTTP://WWW.SUNWORLD.COM/SWOL–02–1998/SWOL–2–SUNSPOTS.HTML," XP–002109935, P. 1, 1998.

Aldrich et al, Providing Easier Access to Remote Objects in Distributed systems, www.cs.caltech.edu/%7ejedi/paper/jedipaper.html, 1997.*

MUX–Elektronik, Java 1.1 Interactive course. www.lls.se/~mux/javaic.html, 1995.*

Fleisch et al, High performance distributed objects using distributed shared memory and remote method invocation. IEEE, Jan. 1998.*

Aldrich et al, Providing access to remote objects in client–server systems. IEEE, Jan. 1998.*

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Department of Comp. Sci., Univ. of Arizona, Jun. 1996.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" Somobjects Developer Toolkit Users Guide, Version 2.1, Oct. 1994 (1994–10), pp. 6–1–6–90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Lindholm et al., "The Java (TM) Virtual Machine Specification", Addison Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Venners, B., "Jini Technology, Out of the Box", Javaworld, 'Online!, pp 1–4, Dec. 1998.

Waldo J et al: "Events in an RPC based distributed system" Proceedings of the 1995 USENIX Technical Conference, Proceedings USENIX Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks", IFIP/IEEE International Workshop on Distributed Systems: Operations and Management, L'Aquila, Italy, Oct. 1996.

Yin J. et al., "Using Leases to Support Server Driven Consistency in Large–Scale Systems", Computer Services Department, University of Texas at Austin, p. 285–294.

Birrell et al., Implementing Remote Procedure Calls, ACM Transactions on Computer Systems, vol. 2, No. 1, Feb. 1984, pp. 39–59.

* cited by examiner

METHOD AND APPARATUS FOR THE SUSPENSION AND CONTINUATION OF REMOTE PROCESSES

BACKGROUND OF THE INVENTION

1. Field of the Invention

This invention generally relates to distributed computing systems and more particularly, to a method and apparatus for the suspension and continuation of remote processes.

2. Related Applications

The following identified U.S. patent applications are relied upon and are incorporated by reference in this application.

Provisional U.S. Patent Application No. 60/076,048, entitled "Distributed Computing System," filed on Feb. 26, 1998.

U.S. patent application Ser. No. 09/044,923; entitled "Method and System for Leasing Storage," filed on the same date herewith.

U.S. patent application Ser. No. 09/044,838, entitled "Method, Apparatus, and Product for Leasing of Delegation Certificates in a Distributed System," filed on the same date herewith.

U.S. patent application Ser. No. 09/044,834, entitled "Method, Apparatus and Product for Leasing of Group Membership in a Distributed System," filed on the same date herewith.

U.S. patent application Ser. No. 09/044,916, entitled "Leasing for Failure Detection," filed on the same date herewith.

U.S. patent application Ser. No. 09/144,933, entitled "Method for Transporting Behavior in Event Based System," filed on the same date herewith.

U.S. patent application Ser. No. 09/044,919, entitled "Deferred Reconstruction of Objects and Remote Loading for Event Notification in a Distributed System," filed on the same date herewith.

U.S. patent application Ser. No. 09/044,938, entitled "Methods and Apparatus for Remote Method Invocation," filed on the same date herewith.

U.S. patent application Ser. No. 09/045,652, entitled "Method and System for Deterministic Hashes to Identify Remote Methods," filed on the same date herewith.

U.S. patent application Ser. No. 09/044,790, entitled "Method and Apparatus for Determining Status of Remote Objects in a Distributed System," filed on the same date herewith.

U.S. patent application Ser. No. 09/044,930, entitled "Downloadable Smart Proxies for Performing Processing Associated with a Remote Procedure Call in a Distributed System," filed on the same date herewith.

U.S. patent application Ser. No. 09/044,917, entitled "Suspension and Continuation of Remote Methods," filed on the same date herewith.

U.S. patent application Ser. No. 09/044,835, entitled "Method and System for Multi-Entry and Multi-Template Matching in a Database," filed on the same date herewith.

U.S. patent application Ser. No. 09/044,839, entitled "Method and System for In-Place Modifications in a Database," filed on the same date herewith.

U.S. patent application Ser. No. 09/044,945, entitled "Method and System for Typesafe Attribute Matching in a Database," filed on the same date herewith.

U.S. patent application Ser. No. 09/044,931, entitled "Dynamic Lookup Service in a Distributed System," filed on the same date herewith.

U.S. patent application Ser. No. 09/044,939, entitled "Apparatus and Method for Providing Downloadable Code for Use in Communicating with a Device in a Distributed System," filed on the same date herewith.

U.S. patent application Ser. No. 09/044,826, entitled "Method and System for Facilitating Access to a Lookup Service," filed on the same date herewith.

U.S. patent application Ser. No. 09/044,932, entitled "Apparatus and Method for Dynamically Verifying Information in a Distributed System," filed on the same date herewith.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," filed on the same date herewith.

U.S. patent application Ser. No. 09/044,934, entitled "Polymorphic Token-Based Control," filed on the same date herewith.

U.S. patent application Ser. No. 07/044,915, entitled "Stack-Based Access Control," filed on the same date herewith.

U.S. patent application Ser. No. 09/044,944, entitled "Stack-Based Security Requirements," filed on the same date herewith.

U.S. patent application Ser. No. 09/044,837, entitled "Per-Method Designation of Security Requirements," filed on the same date herewith.

3. Description of the Related Art

A typical distributed computing system makes the services and computing power of many servers available to many different clients over a network. Typically, a client machine accesses processing capabilities on a server machine using a remote procedure call (RPC) system. The RPC system processes the request on the remote machine and returns the desired results to the requesting client. The network used to transmit the request and return the results can be a local area network (LAN), a wide area network (WAN), and can also include the Internet. Sophisticated distributed computing applications on the Internet offer electronic commerce (e-commerce), telecommuting, and interactive entertainment services around the world using this client-server arrangement.

As the distributed computing paradigm grows in usage and popularity it is increasingly important that resources on the server systems are available to fulfill requests made by the client systems. Each request from a client generally causes a server process to designate resources, including one or more threads, to process the requests. A thread, sometimes called a lightweight process, is a separate sequence of instructions within a process having a separate flow of control. The thread must carve out resources from the system as needed to fulfill the particular request. If resources such as memory and data are available, multiple threads can be executed in parallel to fulfill multiple tasks.

Thread schedulers can be used by the process spawning the threads to coordinate parallel execution of the threads based on a thread's priority, state of execution (i.e. sleep, alive, dead, running), and dependencies among the various threads. A thread scheduler on a single processor system distributes the processor's computing power among many threads to provide the illusion that the threads are actually running in parallel. There are many different scheduling techniques which can be used including first-come-first-served, shortest-thread-first, priority scheduling, and pre-emptive scheduling techniques such as round-robin. Hybrid scheduling techniques which combine these techniques can also be used as needed by the particular implementation. On multiprocessor systems, schedulers associate different threads with different processors to execute threads in parallel and take advantage of the added computing power.

Unfortunately, if these resources are not immediately available, the thread can not continue execution and is blocked from further processing. These blocked threads of execution hold on to server resources, such as memory, as well as the data and control structures associated with the threads themselves. Eventually, the server may run out of threads to allocate incoming client requests. Incoming client requests may be refused and the server will be effectively removed from the distributed computing environment. This blocking scenario can also reduce a servers ability to service existing requests due to overhead associated with denying service to the incoming calls.

Present distributed computing systems are not designed to address this problem of allocating threads. These systems do not release threads and associated resources when a remote server process is blocked waiting for a resource or particular event. Consequently, transaction intensive distributed computing environments can suffer from the blocking scenario described above. For example, assume a server process receives multiple requests to download a file from multiple clients over the Internet. The server process receives multiple threads from the server operating system to process the requests in parallel but the file requested is locked by another process and is not available. A conventional system would block further processing on each thread and wait for the file to be unlocked. The threads on the server would remain idle even though other processes could utilize the thread resources to process other tasks. When the number of threads on a server system are depleted, the server process will deny service to additional clients. Eventually, the server system will have difficulty processing general tasks.

On many distributed computing systems, the inability to allocate threads and other resources can negatively impact overall processing throughput. Even the high-speed bandwidth available on a distributed computing network will go unused if threads and other resources are not allocated efficiently on the server system.

Based on the above limitations found in conventional systems, it is desirable to improve the allocation of threads and other resources used in a distributed computing environment.

SUMMARY OF THE INVENTION

Consistent with the present invention, as embodied and broadly described herein, a method and apparatus for enabling a remote method to suspend processing and relinquish resources to the server system comprises receiving a request from a remote method call on a client system. The remote method is allocated system resources from the server system and invoked. One system level type of resource is a thread. The method determines if any general resources required for processing the remote method are presently not available. A general resource can be memory, disk storage space, data, or any resource that a system resource may depend on. The remote method is suspended from further processing and system resources are relinquished to the server system when the remote method depends on a general resource which is not available.

Another method consistent with the present invention, enables a previously suspended remote method to continue processing on the server system and generate a result for a client application. This method comprises receiving an indication that a continuation event associated with a suspended remote method has occurred. System resources and general resources are allocated to the remote method in preparation to continue processing the remote method. The remote method utilizes the combined allocated resources to continue execution and generate results. These results are transmitted from the server system to the client application on the client system using a remote procedure call (RPC) system such as remote method invocation (RMI).

BRIEF DESCRIPTION OF THE DRAWINGS

The accompanying drawings, which are incorporated in and constitute a part of this specification, illustrate an embodiment of the invention and, together with the description, serve to explain the advantages, and principles of the invention.

In the drawings.

DETAILED DESCRIPTION

Introduction

Figure 1:
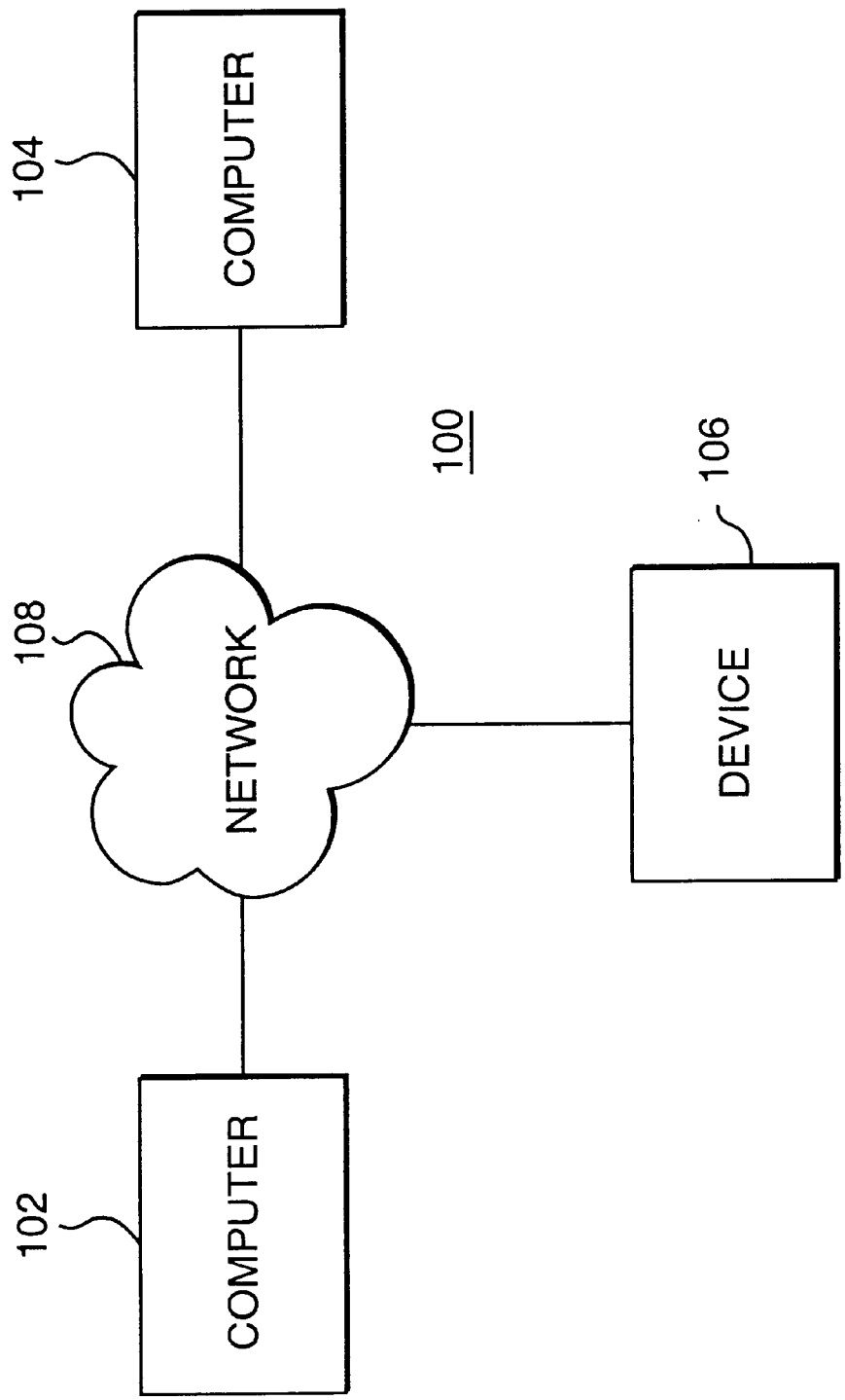
FIG. 1. illustrates a network suitable for use with methods and systems consistent with the present invention.

Reference will now be made in detail to an implementation of the present invention as illustrated in the accompanying drawings. Wherever possible, the same reference numbers will be used throughout the drawings and the following description to refer to the same or like parts.

A system designed consistent with the present invention assumes that a computer system can host either client or server functions. The roles each computer assumes in a client-server system depends on the specific call being made between the client and the server. For example, a client process typically requests a service generated by a server process located on a remote machine. Conversely, a server process is located on a machine which receives and services a clients requests. Therefore, the same computer system can act as a client when requesting a service and a server when fulfilling a request for a service.

Systems consistent with the present invention address shortcomings of the prior art and provide a method and apparatus for the suspension and continuation of remote processes. In the past, remote procedure call (RPC) systems did not enable a remote process to release resources while the remote process was blocked waiting for an event to occur or a resource to be released. This technique kept the connection between the client process and server process active but left important resources such as threads, memory, and secondary storage idle. In contrast, systems designed consistent with the present invention allow a remote server process blocked from further processing to relinquish threads and other resources while not dropping the connection between the client and server systems. This novel technique permits other processes to utilize server resources even when a remote process is blocked. Specifically, this prevents a remote server process from denying clients access to the system. Consequently, embodiments of the present invention use threads and other resources more efficiently which increases the effective throughput of a distributed computing system.

In addition, systems consistent with the present invention are also advantageous in that they are compatible with clients on existing client-server systems. This is especially important in heterogeneous networked computing environments such as the Internet. Because the server is modified to allocate and deallocate resources more efficiently, the present invention does not influence the design and operation of the client system. Accordingly, a client would not require modification to work with a system of the present design.

Overview of the Distributed System

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the exemplary distributed system utilizes the Java™ programming environment to allow both code and data to be moved from device to device in a seamless manner. Accordingly, the exemplary distributed system is layered on top of the Java programing environment and exploits the characteristics of this environment, including the security offered by it and the strong typing provided by it. The Java programming environment is more clearly described in Jaworski, *Java 1.1 Developer's Guide*, Sams.net (1977), which is incorporated herein by reference.

In the exemplary distributed system, different computers and devices are federated into what appears to the user to be a single system. By appearing as a single system, the exemplary distributed system provides the simplicity of access and the power of sharing that can be provided by a single system without giving up the flexibility and personalized response of a personal computer or workstation. The exemplary distributed system may contain thousands of devices operated by users who are geographically disperse, but who agree on basic notions of trust, administration, and policy.

Within the exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

FIG. 1 depicts the exemplary distributed system 100 containing a computer 102, a computer 104, and a device 106 interconnected by a network 108. The device 106 may be any of a number of devices, such as a printer, fax machine, storage device, computer, or other devices. The network 108 may be a local area network, wide area network, or the Internet. Although only two computers and one device are depicted as comprising the exemplary distributed system 100, one skilled in the art will appreciate that the exemplary distributed system 100 may include additional computers or devices.

Figure 2:
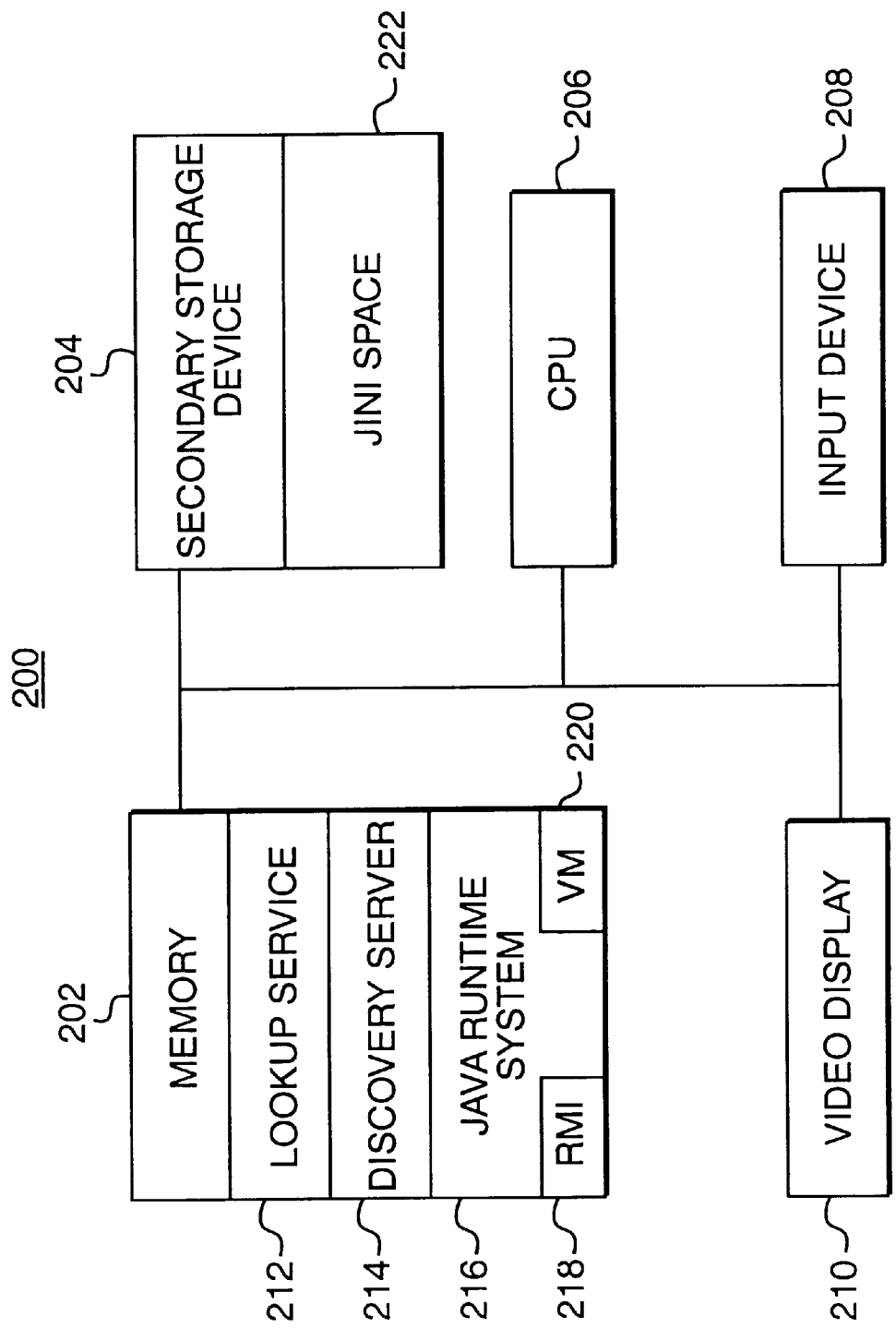
FIG. 2 is block diagram of a computer system suitable for use with methods and systems consistent with the present invention.

FIG. 2 depicts the computer 102 in greater detail to show a number of the software components of the exemplary distributed system 100. One skilled in the art will appreciate that computer 104 or device 106 may be similarly configured. Computer 102 includes a memory 202, a secondary storage device 204, a central processing unit (CPU) 206, an input device 208, and a video display 210. The memory 202 includes a lookup service 212, a discovery server 214, and a Java™ runtime system 216. The Java runtime system 216 includes the Java™ remote method invocation system (RMI) 218 and a Java™ virtual machine 220. The secondary storage device 204 includes a Java™ space 222.

As mentioned above, the exemplary distributed system 100 is based on the Java programming environment and thus makes use of the Java runtime system 216. The Java runtime system 216 includes the Java™ API, allowing programs running on top of the Java runtime system to access, in a platform-independent manner, various system functions, including windowing capabilities and networking capabilities of the host operating system. Since the Java API provides a single common API across all operating systems to which the Java runtime system 216 is ported, the programs running on top of a Java runtime system run in a platform-independent manner, regardless of the operating system or hardware configuration of the host platform. The Java runtime system 216 is provided as part of the Java™ software development kit available from Sun Microsystems of Mountain View, Calif.

The Java virtual machine 220 also facilitates platform independence. The Java virtual machine 220 acts like an abstract computing machine, receiving instructions from programs in the form of byte codes and interpreting these byte codes by dynamically converting them into a form for execution, such as object code, and executing them. RMI 218 facilitates remote method invocation by allowing objects executing on one computer or device to invoke methods of an object on another computer or device. Both RMI and the Java virtual machine are also provided as part of the Java software development kit.

The lookup service 212 defines the services that are available for a particular Djinn. That is, there may be more than one Djinn and, consequently, more than one lookup service within the exemplary distributed system 100. The lookup service 212 contains one object for each service within the Djinn, and each object contains various methods that facilitate access to the corresponding service. The lookup service 212 and its access are described in greater detail in co-pending U.S. patent application Ser. No. 09/044,826, entitled "Method and System for Facilitating Access to a Lookup Service," which has previously been incorporated by reference.

The discovery server 214 detects when a new device is added to the exemplary distributed system 100, during a process known as boot and join or discovery, and when such a new device is detected, the discovery server passes a reference to the lookup service 212 to the new device, so that the new device may register its services with the lookup service and become a member of the Djinn. After registration, the new device becomes a member of the Djinn, and as a result, it may access all the services contained in the lookup service 212. The process of boot and join is described in greater detail in co-pending U.S. patent application Ser. No. 09/044,939, entitled "Apparatus and Method for providing Downloadable Code for Use in Communicating with a Device in a Distributed System," which has previously been incorporated by reference.

The Java space 222 is an object repository used by programs within the exemplary distributed system 100 to store objects. Programs use the Java space 222 to store objects persistently as well as to make them accessible to other devices within the exemplary distributed system. Java spaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that the exemplary distributed system 100 may contain many lookup services, discovery servers, and Java spaces.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the SunLogo, Java, and Java-based trademarks are trademarks or registered trademarks of Sun Microsystems Inc. in the United States and other countries.

Exemplary Client-Service System

Figure 3:
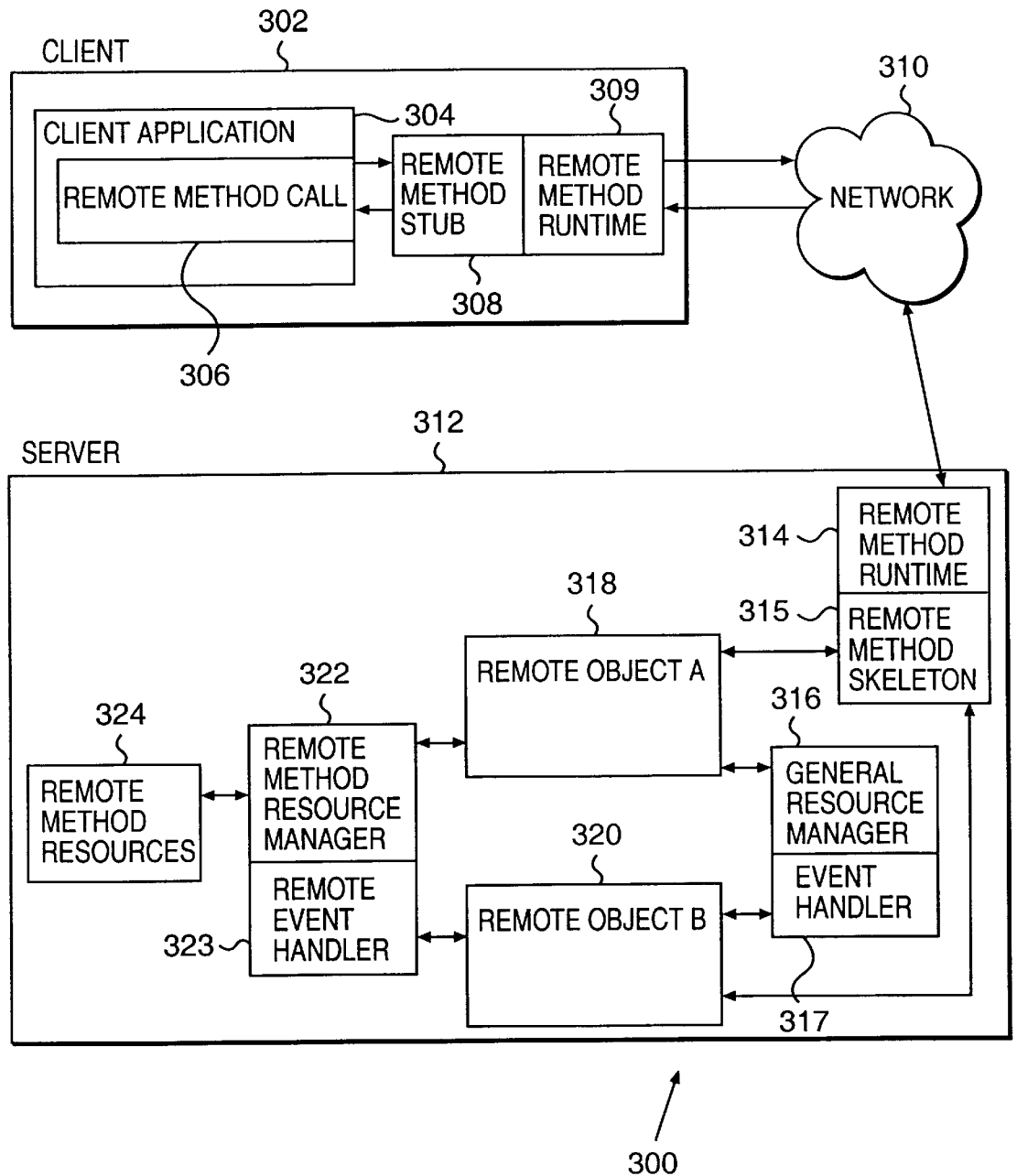
FIG. 3 is a block diagram of a client-server networking environment suitable for use with methods and systems consistent with the present invention.

FIG. 3 depicts an exemplary client-server system consistent with the present invention and exemplary distributed system 100. Accordingly, client-server system 300 consists of a client computer 302, also referred to as client 302, a server computer 312, also referred to as server 312, and a network 310 coupled between client 302 and server 312. This particular client-server system can be implemented using the Java™ object oriented language and as an enhancement to RMI 218. However, those skilled in the art will appreciate that similar systems consistent with the present invention can be implemented using a general remote procedure call (RPC) system and other object and non-object oriented languages.

Client 302 includes a client application 304 having a remote method call 306, a remote stub 308, and a remote method runtime 309. Client application 304 is typically software developed by a user and includes remote method call 306 for invoking a process on server 312. For example, client application 304 can be a Java™ application written in the Java™ programming language. Remote method call 306 is implemented using an RPC mechanism such as RMI.

Remote method stub 308 marshals data and parameters provided by remote method call 306. The data and parameters are arranged in a predetermined format that can be unmarshalled by a remote method skeleton 315 on server 312. Remote method runtime 309 tracks the status of processes associated with remote method call 306 as they are processed on server 312. Remote method runtime 309 also determines whether the communication link between client application 304 and server 312 is up or has been disconnected. Remote method runtime 309 can query server 312 for the status of the link. If no response is made in a reasonable period of time or server 312 indicates the link is down, remote method runtime 309 notifies client application 304 that the remote method call has terminated.

Network 310 provides a communication link between client 302 and server 312. Network 310 can be the Internet or a corporate or campus-wide intranet. Network 310 can use TCP/IP or any other network protocols including Novell Netware, AppleTalk, X.25, or any other network capable of supporting an RPC system such as RMI.

Server 312 includes a corresponding remote method runtime 314 and remote method skeleton 315. In contrast to client 302, server 312 also includes a general resource manager 316, an event handler 317, a remote method resource manager 322, a remote event handler 323, and numerous remote method resources 324. Server 312 also includes a remote object A 318 and a remote object B 320. Each remote object is associated with a number of methods (not shown) which client application 304 can invoke using remote method call 306. Alternative configurations of server 312 may include any number of remote objects for performing remote methods as required by the particular system.

Remote method runtime 314 is responsible for keeping client 302 informed of the remote method execution status. Remote method runtime 314 provides information to client 302 indicating that the remote method is processing data. Consistent with the present invention, the processing status is not interrupted even when a remote method is suspended. Instead, remote method runtime 314 maintains the connection with client 302 until the remote method completes processing the requested task Remote method runtime 314 also indicates to client 302 when a remote method has terminated abnormally or in error.

The method determines if any general resources required for processing the remote method are presently not available. A general resource can be memory, disk storage space, data, or any resource that a system resource may depend on.

Remote method skeleton 315 is responsible for unmarshalling data and parameters transmitted over network 310. The parameters and data are used as arguments for executing a remote method on server 312.

General resource manager 316 and event handler 317 manage resources used by local processes and methods executed on server 312. Local methods executed on server 312 look to general resource manager 316 and event handler 317 to coordinate allocation and deallocation of general resources. These general resources can include primary storage, such as memory, or secondary storage, such as disk and tape drives. Unlike system resources discussed below, general resources are typically not used for fulfilling remote method requests. Event handler 317 detects events associated with local processes and, therefore, the details of event handler 317 are not included in this specification. Essentially, general resource manager 316 and event handler 317 are dedicated to managing resources associated with those processes and methods which are not being invoked remotely from a client such as client 302.

In contrast, remote method resource manager 322 and remote event handler 323 are responsible for allocating and deallocating remote method resources 324 as needed by remote methods. Remote method resources 324 can be considered a system resource since they enable a method to utilize a system level resource such as networking. Often, the system resources will have dependencies on the general resources mentioned above.

Remote method resource manager 322 transfers remote method resources 324 between remote methods associated with remote object 318, remote object 320, and other objects (not shown). Remote event handler 323 detects when resources are released that a remote method needs to process a particular task. Transferring these remote method resources is facilitated utilizing an implementation of the present invention as discussed below.

Suspend and Continuation of Remote Methods

A suspend method is invoked when a remote method is about to block. This typically occurs just before a remote method is blocked waiting for a resource to become available. The suspend method marks the remote method as suspended and a remote method resource manager returns threads and other resources back to the server system. When the resources become available, a remote method resource manager and a continue method work together to allocate the threads and other remote method resources to the suspended remote method. Eventually, a remote method runtime invokes the suspended remote method so that it may continue processing. For example, a remote method waiting for a write operation enters a ready to block state and relinquishes threads and other resources by invoking a suspend operation. The suspend operation marks the remote method as suspended and the remote method resource manager returns the threads to a thread pool associated with the server system. Once the write operation occurs, a continue method marks the suspended remote method as runnable and the remote method resource manager allocates threads and to other resources back to the suspended remote process. A remote method runtime invokes the previously suspended remote method which enables the remote method to read the data.

Figure 4:
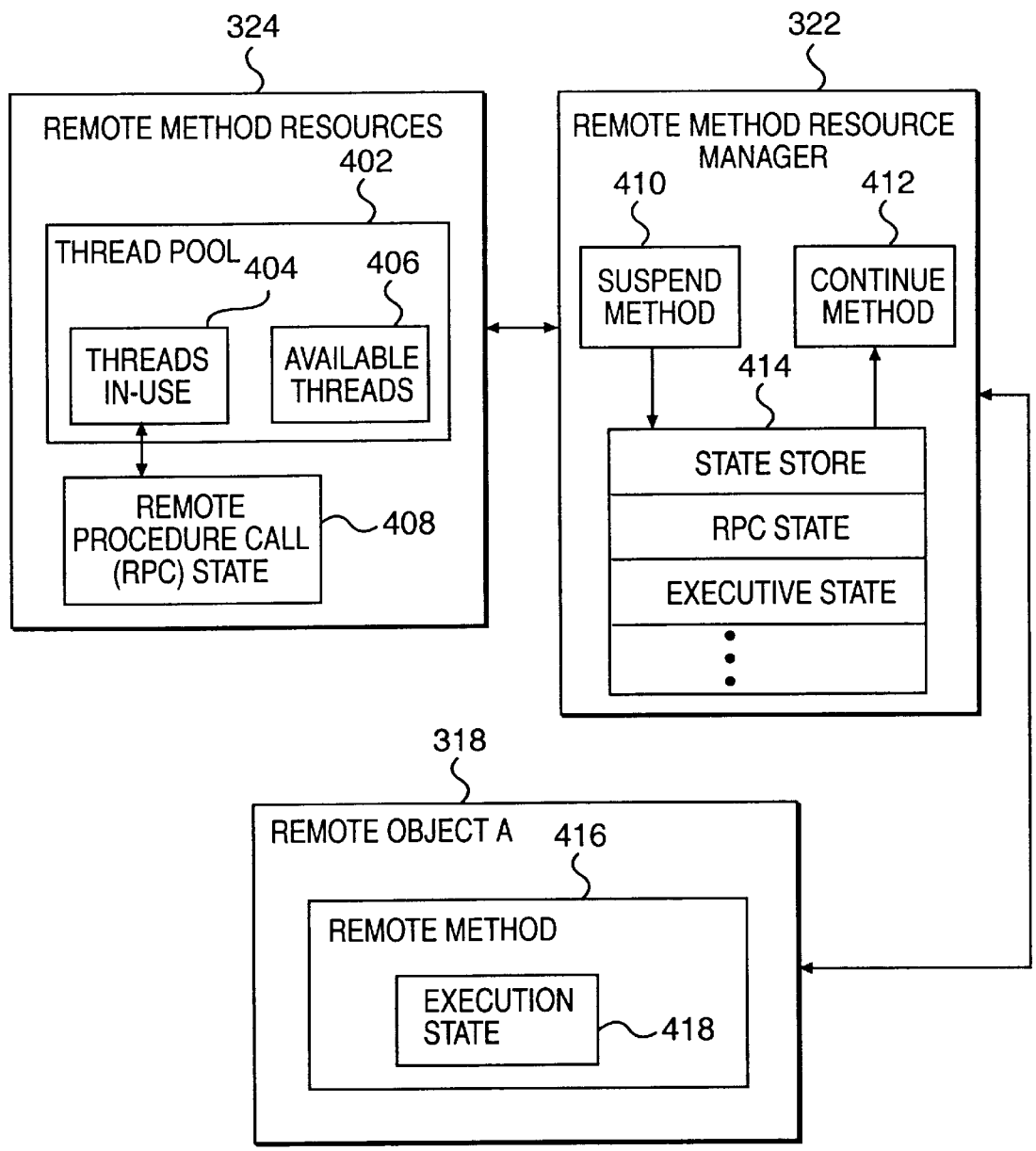
FIG. 4 is a block diagram of the subsystems used to suspend and continue processing of remote method calls consistent with methods and systems of the present invention.

FIG. 4 is a block diagram illustrating the essential software subsystems used to suspend and continue processing a remote method. These software subsystems include remote method resources 324, remote method resource manager 322, and exemplary remote object A 318 having remote method 416 and execution state 418.

Remote method resources 324 in FIG. 4 includes a thread pool 402 having threads in-use 404, available threads 406, and an RPC state 408. Threads in-use 404 contains references to threads currently being used by remote methods while available threads 406 contains threads currently available for use by remote methods. RPC state 408 is kept in remote method resources 324 to store information used by an RPC system, such as RMI, when a remote method is suspended. This information can include information the RPC system to continue processing a suspended remote method and return results to the client. In an alternative embodiment, remote method resources 324 could also include other resources other than threads. These other network resources could include primary storage, secondary storage and any other resource used in conjunction with processing remote methods.

Remote method resource manager 322 includes a suspend method 410, a continuation method 412, and a state store 414. Suspend method 410 obtains an execution state 418 from remote method 416 and a RPC state 408 from remote method resources 324. This state information is stored in state store 414 before remote method 416 is suspended. Typically, suspend method 410 marks a remote method 416 as suspended when remote method 416 indicates that it is about to be blocked and that it has threads and other resources. Eventually, remote method resource manager 322 returns the threads and other resources to server 312 and remote method 416 is suspended from further processing. For example, assume remote method 416 is attempting to read data from a queue which is temporarily empty. When remote method 416 detects the queue is empty, remote method 416 will invoke suspend method 410 to initiate the suspension process.

Continue method 412 is the companion to suspend method 410. Continue method 412 is typically invoked when a resource is available or a particular event has occurred. For example, writing data to a particular queue can trigger a continuation event which can invoke continue method 412. Continue method 412 locates the suspended remote method waiting on the resource and marks it as runnable. Eventually, remote method resource manager 322 allocates threads and other resources to the previously suspended remote method. Execution state 418 and RPC state 408 stored in state store 414 are used to ensure that remote method 416 continues processing at the appropriate point prior to being suspended.

Figure 5:
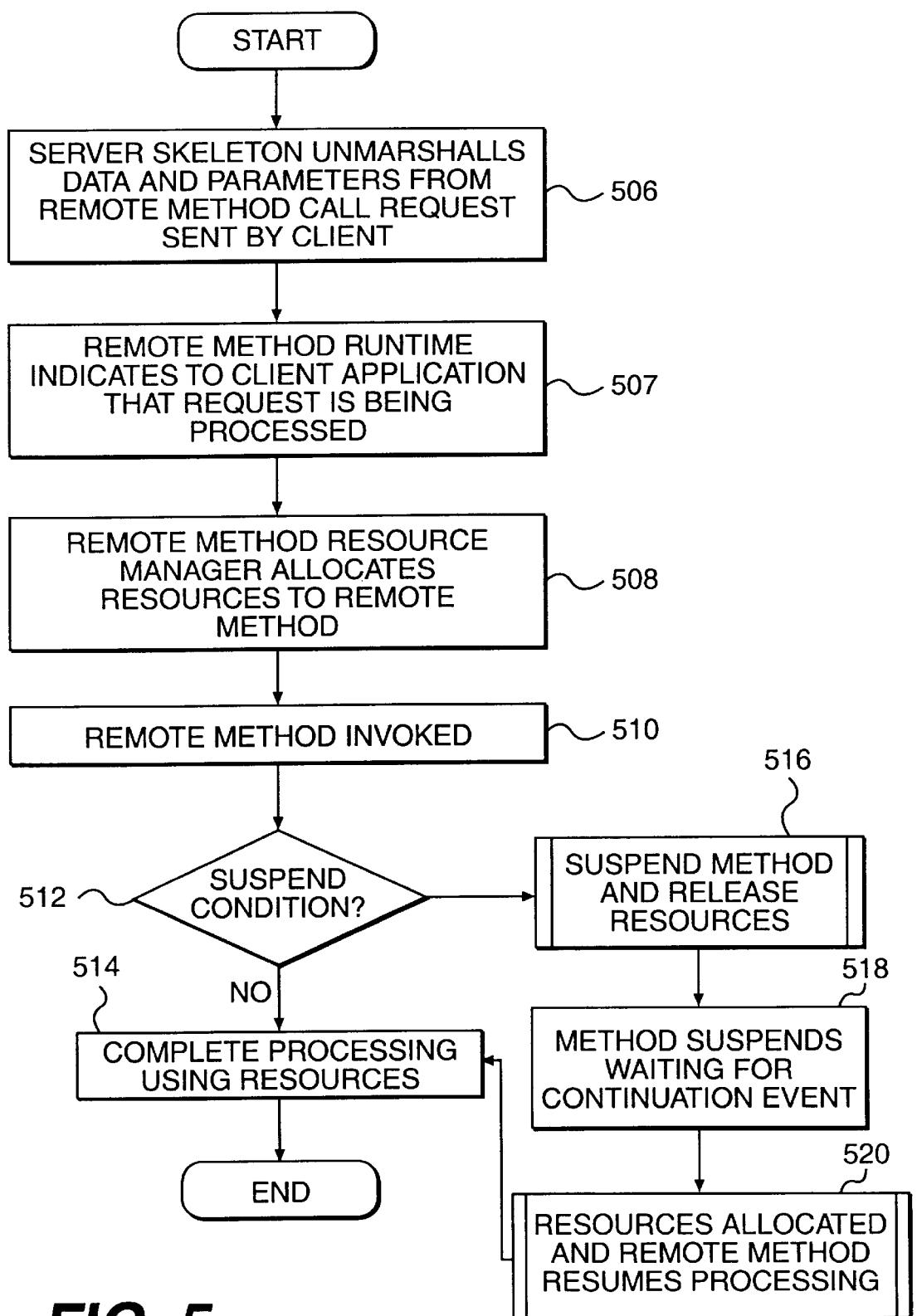
FIG. 5 is a flow chart of the steps performed to suspend and continue a remote method call consistent with methods and systems of the present invention.

In operation, the suspend and continuation methods are used together to manage threads and other resources on server system 312. FIG. 5 is a flow chart indicating the steps performed to suspend and continue a remote call in consistent with methods and systems of the present invention.

Initially, the server 312 receives a request from remote method call 306 on client 302 to process remote method 416. Accordingly, remote method skeleton 315 unmarshalls the data and parameters transmitted in the request (step 506). After the data and parameters are decoded by remote method skeleton 315 they are passed to remote method 416.

Remote method runtime 314 on server 312 indicates to remote method runtime 309 on client 302 that server 312 has received the request to invoke remote method 416 and is processing the request (step 507). Client application 304 continues to receive an indication that server 312 is processing the request even if remote method 416 is suspended and threads and other resources are relinquished.

Remote method resource manager 322 allocates the threads and other resources to remote method 416 which is about to be invoked (step 508). Threads allocated to remote method 416 are taken from available threads 406 in thread pool 402. Multiple threads can be used to process several remote methods or tasks in parallel. Assuming the threads and other resources are available, remote method runtime 314 invokes remote method 416 on behalf of client application 304 (step 510). If the remote method resource manager cannot allocate a thread or other resources to remote method 416, it is put on an execution queue pending release of a thread or other resources from another process.

Remote method 416 includes instructions for determining if a suspend condition exists (step 512). These instructions also include information to determine when a continuation condition exists. A suspend condition occurs when remote method 416 depends on a resource which is not available or an event which has not yet occurred. In contrast, the continuation event occurs when the resource is available or the event occurs. For a suspend condition example, assume remote method 416 is sampling data points and pauses a long time interval between each sampling. During this long pause, remote method 416 may block waiting for a timer event to indicate the end of the next time interval.

When the suspend condition is detected, remote method 416 relinquishes resources and registers continuation instructions with a remote event handler 323 to monitor certain resources and events (step 516). Next, remote method 416 is suspended from further processing and awaits the particular continuation event in order to continue processing (step 518).

When the continuation event occurs, resources are allocated to the remote method and the remote method resumes processing (step 520). A continuation event is an event generated when a resource becomes available or an event occurs that a suspended remote method depends on for further processing. Remote event handler 323 processes the continuation instructions registered by suspended remote method 416. The remote method completes the task and returns the results back to client application 304 (step 514). It should be understood that a remote method can be suspended and continued many times before completing a task and returning results to the client.

Suspension of Remote Methods

Figure 6:
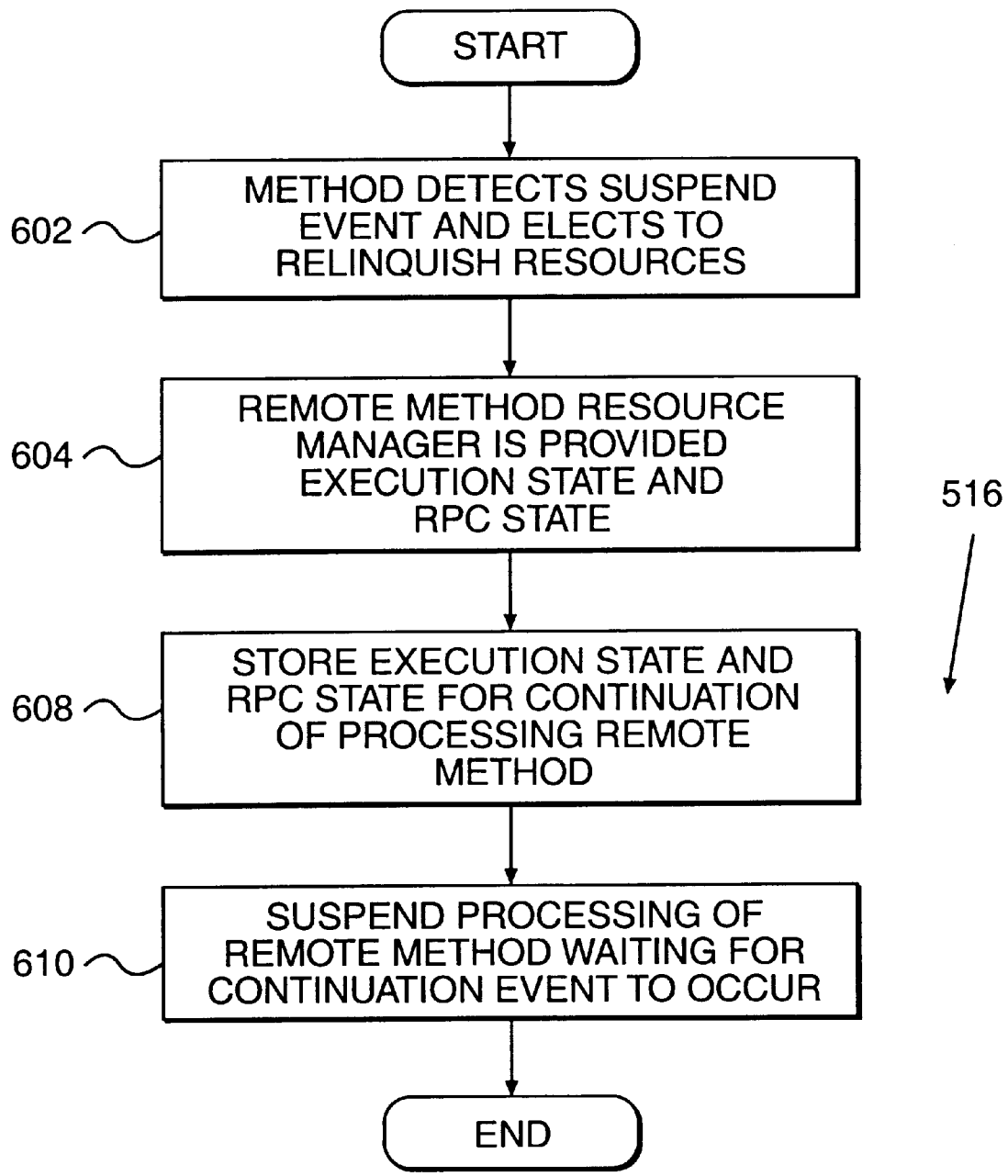
FIG. 6 is a flow chart of the steps performed to suspend a remote method call consistent with methods and systems of the present invention.

FIG. 6 is a flow chart of the steps performed to suspend a remote call consistent with methods and systems of the present invention. Initially, remote method 416 detects that a suspend event has occurred and elects to relinquish threads and other resources (step 602). Remote method is marked as being suspended by suspend method 410. Before being suspended, remote method 416 provides remote method resource manager 322 with execution state 418, RPC state 408, and relinquishes the threads and other resources (step 604). Remote method resource manager 322 places these threads back into available threads 406. Alternatively, remote method 416 can choose to suspend processing without relinquishing any threads or resources.

Execution state 418 records state information related to remote method 418 at the time it is suspended including local variables, program counter, and any other information related to remote method 416. As mentioned above, RPC state 408 records state information associated with the RPC system, such as RMI, when remote method 416 is suspended. RPC state 408 enables the RPC system to communicate with a client and return results when remote method 416 continues execution.

Next, remote method resource manager 322 stores RPC state 408 and execution state 418 (step 608). Remote method resource manager 322 stores this state information to continue processing a suspended remote method at some time in the future. Remote method 416 also registers continuation instructions with remote event handler 323 which monitors certain resources and events. Generally, the continuation instructions are used for preprocessing data and contacting the appropriate suspended process. Last, remote method 416 is blocked from further processing and waits for a continuation event to occur (step 610).

Continuation of Remote Methods

Figure 7:
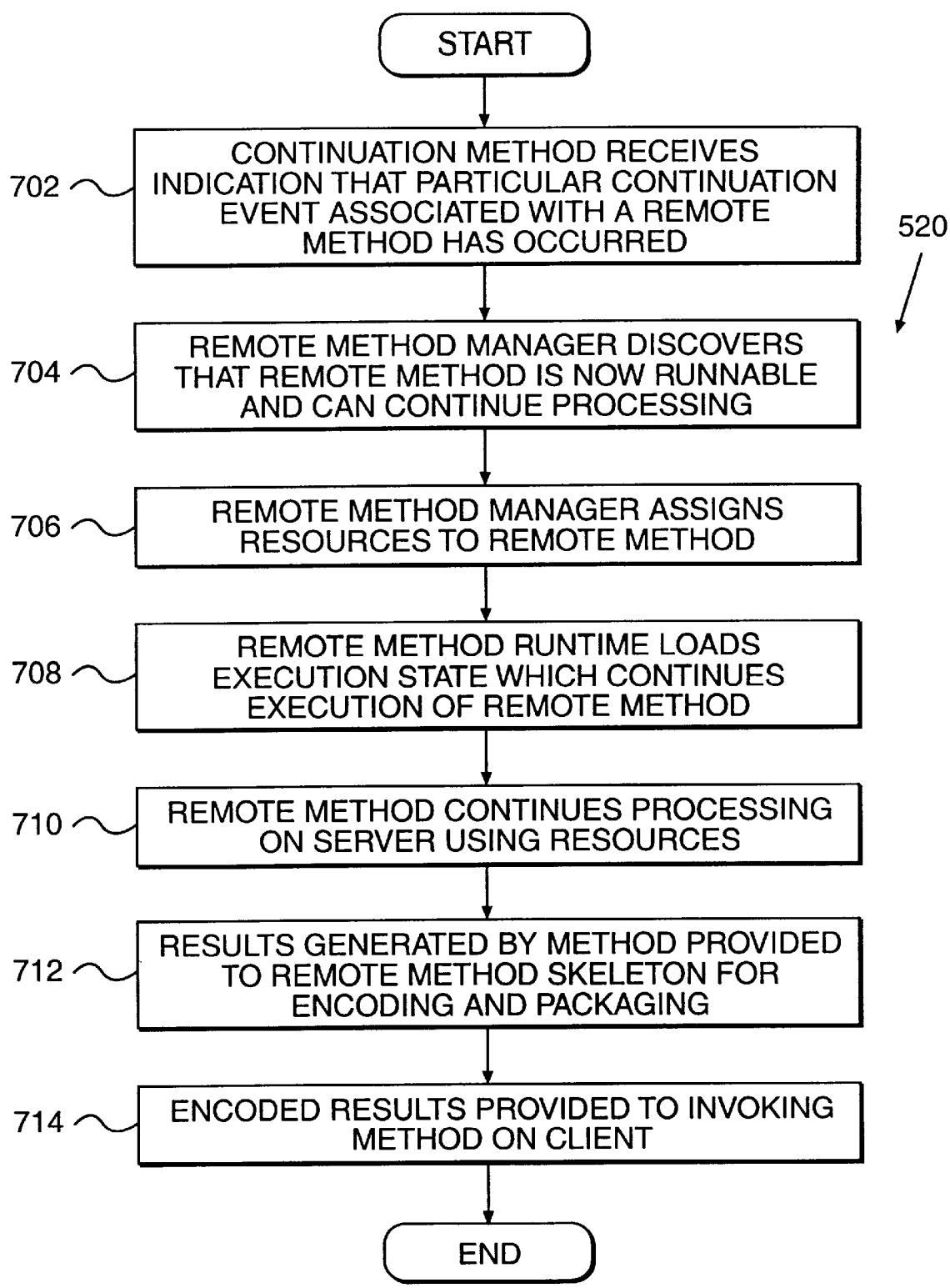
FIG. 7 is a flow chart of the steps performed to continue a remote method call consistent with methods and systems of the present invention.

FIG. 7 is a flow chart of the steps performed to continue a previously suspended remote method, such as remote method 41 with methods and systems consistent with the present invention. Typically, each step of this process occurs asynchronously as the particular conditions are met.

Initially, remote event handler 323 receives an indication that a particular continuation event has occurred. Remote event handler 323 associates the continuation event with a particular remote method (step 702) and invokes the corresponding continuation instructions. The continuation event is an event generated when a resource becomes available or an event occurs which the suspended remote method depends on for further processing. For example, a continuation event can occur when information is written to a queue that a suspended remote method was waiting to read.

The continuation instructions invoke continue method 412 which marks the suspended remote method 416 as a runnable process. Eventually, remote method resource manager 322 discovers the status of suspended method 416 which indicates the remote method is now runnable and can continue processing (step 704). Step 704 is typically an asynchronous process that occurs when remote method resource manager checks for status on the suspended process and not necessarily when status of the remote process is changed to runnable. Remote method resource manager 322 allocates the resources, such as threads, to remote method 416 (step 706).

Remote method runtime 314 loads execution state 418 and RPC state 408 from state store 414. Execution state 418 prepares remote method 416 to continue processing at the point it left off prior to being suspended (step 708). To implement this in software, remote method 416 may be several pieces of interrelated code which each start where the previous code section stopped prior to being suspended. Alternatively, remote method 416 can be implemented as a single code segment with execution starting at different points in the code segment. As previously mentioned, RPC state 408 enables the RPC system, such as RMI 218, to continue processing and return results to the proper remote method call 306.

Remote method runtime 314 enables remote method 416 to continue execution. Remote method 416 then continues processing on the server using the assigned threads and other resources (step 710). Eventually, results are generated by remote method 416 and are provided to remote method skeleton 315 for encoding and packaging (step 712). These encoded results are passed over network 310 to remote method stub 308 where they are decoded and provided to remote method call 306 (step 714).

While specific embodiments have been described herein for purposes of illustration, various modifications may be made without departing from the spirit and scope of the invention. Accordingly, the invention is not limited to the above described embodiments, but instead is defined by the appended claims in light of their full scope of equivalents.

What is claimed is:

1. A method performed on a server system having resources which is operatively coupled to a client system over a network and enables a remote method to suspend processing and relinquish corresponding resources to the server system, the method comprising the steps of:

receiving a request from a client system with a remote method call transmitted using a remote procedure call (RPC) system which further includes the substeps of:
indicating to the client system that the server system has received the request to invoke a remote method;
allocating resources to the remote method;
invoking the remote method;
determining if the remote method depends on any resources which are not available or an event which has not occurred yet;
suspending the remote method from further processing and relinquishing resources from the remote method when the remote method depends on a resource that is not available or an event that has not occurred yet, which further includes the substeps of,
relinquishing resources previously allocated to the remote method system for use by other processes and methods on the server system;
providing an execution state associated with the remote method and a remote procedure call (RPC) state associated with the remote method call to continue processing the remote method at a subsequent time period; and
blocking the remote method from further processing until the resource which was not available is released and made available to the remote method or the event that caused the suspension of the remote method.

2. A method performed on a server system having a plurality of resources which is operatively coupled to a client system over a network, for enabling a previously suspended remote method to continue processing on the server system, wherein the server system stores an execution state and a remote procedure call (RPC) state associated with the remote method call to continue processing the remote method at a subsequent time period, the method comprising the steps of:

receiving an indication that a continuation event associated with a suspended remote method has occurred wherein the continuation event is generated when a required resource for the remote method becomes available or an event occurs that previously caused the suspension of the remote method;
allocating resources to the remote method in preparation to continue processing, which further comprises the substeps of:
indicating to a remote method resource manager that the remote method can continue processing, and
distributing resources controlled by a remote method resource manager to the remote method;
continuing execution of the remote method utilizing the allocated resources, including the substep of:
initializing the remote method with an execution state and a remote procedure call (RPC) system with a RPC state wherein the execution state includes information associated with the remote method before it was suspended and the RPC state includes information associated with the remote method call;
generating results from the remote method; and
transmitting the results from the server system to the client application on the client system.

3. A method performed on a server system for enabling a remote method to suspend processing and relinquish resources to the server system which is operatively coupled to a client system over a network, the method comprising the steps of:

receiving a request from a remote method call on a client system;
allocating system resources to the remote method associated with the server system;
invoking the remote method associated with the server system;
determining an availability of general resources required for processing the remote method; and
suspending the remote method from further processing when the remote method depends on a general resource which is not available, including the substeps of:
relinquishing system resources and general resources to the server system,
blocking the remote method from further processing until the resource which was not available is released and made available to the remote method, and
providing an execution state and a remote procedure call (RPC) state associated with the remote method call to continue processing the remote method at a subsequent time period.

4. The method of claim 3 wherein the server system includes a processor, a primary storage device, a secondary storage device, a display device, and an input/output mechanism.

5. The method of claim 3 wherein the system resources include threads.

6. The method of claim 3 wherein the general resources include data.

7. The method of claim 3 wherein the request is transmitted using a remote method invocation (RMI) system.

8. The method of claim 3 wherein the suspending step further includes the substeps of,
relinquishing system resources and general resources to the server system; and
blocking the remote method from further processing until the resource which was not available is released and made available to the remote method.

9. The method of claim 8 wherein the suspending step further includes the substeps of providing an execution state associated with the remote method and a remote procedure call (RPC) state associated with the remote method call to continue processing the remote method at a subsequent time period.

10. A method performed on a server system for enabling a previously suspended remote method to continue processing on the server system and generate a result for a client application on a client system which is operatively coupled to the server system over a network, wherein the server system stores an execution state and a remote procedure call (RPC) state associated with the remote method call to continue processing the remote method at a subsequent time period, the method comprising the steps of:

receiving indication that a continuation event associated with a suspended remote method has occurred;
allocating system resources and general resources to the remote method in preparation to continue processing:
continuing execution of the remote method utilizing the allocated resources;
generating results from the remote method; and
transmitting the results from the server system to the client application on the client system.

11. The method of claim 10 wherein the server system includes a processor, a primary storage device, a secondary storage device, a display device, and an input/output mechanism.

12. The method of claim 10 wherein the system resources include threads.

13. The method of claim 10 wherein the general resources includes data.

14. The method of claim 10 wherein the step of continuing execution of the remote method further includes the substeps of:

initializing the remote method with an execution state and a remote procedure call (RPC) system with a RPC state wherein the execution state includes information associated with the remote method before it was suspended and the RPC state includes information associated with the remote method call; and generating results from the remote method.

15. The method of claim 10 wherein the transmitting step uses a remote method invocation (RMI) system.

16. A computer-readable medium containing instructions which enables a remote method executed on a computer server system to suspend processing and relinquish resources to the computer server system by:

receiving a request from a remote method call on a client system;

allocating system resources to the remote method associated with the server system;

invoking the remote method associated with the server system;

determining an availability of general resources required for processing the remote method; and suspending the remote method from further processing when the remote method depends on a general resource which is not available, including the substeps of:
   relinquishing system resources and general resources to the server system, blocking the remote method from further processing until the resource which was not available is released and made available to the remote method, and providing an execution state and a remote procedure call (RPC) state associated with the remote method call to continue processing the remote method at a subsequent time period.

17. The computer-readable medium of claim 16 wherein the system resources include threads.

18. The computer-readable product of claim 16 wherein the general resources include data.

19. The computer-readable medium of claim 16 where in the request is transmitted using an remote method invocation (RMI) system.

20. The computer-readable medium of claim 16 wherein the suspending is further performed by, relinquishing module configured to relinquish system resources and general resources to the server system; and a blocking module configured to block the remote method from further processing until the resource which was not available is released and made available to the remote method.

21. A computer-readable medium containing instructions which enables a previously suspended remote method to continue processing on a server system and generate a result for a client application on a client system, wherein the server system stores an execution state and a remote procedure call (RPC) state associated with the remote method call to continue processing the remote method at a subsequent time period, by:

receiving indication that a continuation event associated with a suspended remote method has occurred;

allocating system resources and general resources to the remote method in preparation to continue processing;

continuing execution of the remote method utilizing the allocated resources;

generating results from the remote method; and transmitting the results from the server system to the client application on the client system.

22. The computer-readable medium of claim 21 wherein the system resources include threads.

23. The computer-readable product of claim 21 wherein the general resources include data.

24. The computer-readable product of claim 21 wherein the transmitting uses a remote method invocation (RMI) system.

25. An apparatus for enabling a remote method to suspend processing and relinquish resources to a server system which is operatively coupled to a client system over a network, comprising:

a receiver module configured to receive a request from a remote method call on a client system;

an allocating module configured to allocate system resources to the remote method associated with the server system;

an invoking module configured to invoke the remote method associated with the server system;

a determining module configured to determine if any general resources required for processing the remote method are not available; and a suspending module configured to suspend the remote method from further processing when the remote method depends on a general resource which is not available, including:
   a relinquishing module configured to relinquish system resources and general resources to the server system, a blocking module configured to block the remote method from further processing until the resource which was not available is released and made available to the remote method, and a providing module configured to provide an execution state and a remote procedure call (RPC) state associated with the remote method call to continue processing the remote method at a subsequent time period.

26. The apparatus of claim 25 wherein the server system includes a processor, a primary storage device, a secondary storage device, a display device, and an input/output mechanism.

27. The apparatus of claim 25 wherein the system resources include threads.

28. The apparatus of claim 25 wherein the general resources include data.

29. The apparatus of claim 25 wherein the request is transmitted using a remote method invocation (RMI) system.

30. The apparatus of claim 25 wherein the suspending module step further comprises, a relinquishing module configured to relinquish system resources and general resources to the server system; and a blocking module configured to block the remote method from further processing until the resource which was not available is released and made available to the remote method.

31. An apparatus for enabling a previously suspended remote method to continue processing on a server system and generate a result for a client application on a client system which is operatively coupled to the server system over a network, wherein the server system stores an execution state and a remote procedure call (RPC) state associated with the remote method call to continue processing the remote method at a subsequent time period, the apparatus comprising:

a receiver module to receive an indication that a continuation event associated with a suspended remote method has occurred;

an allocating module configured to allocate system resources and general resources to the remote method in preparation to continue processing:

a continuing module configured to continue execution of the remote method utilizing the allocated resources;

a generating module configured to generate results from the remote method; and a transmitting module configured to transmit the results from the server system to the client application on the client system.

32. The apparatus of claim 31 wherein the server system includes a processor, a primary storage device, a secondary storage device, a display device, and an input/output mechanism.

33. The apparatus of claim 31 wherein the system resources include threads.

34. The apparatus of claim 31 wherein the general resources includes data.

35. The apparatus of claim 31 wherein the transmitting module uses a remote method invocation (RMI) system.

36. An apparatus coupled to a server system for enabling a remote method to suspend processing and relinquish resources to the server system which is operatively coupled to a client system over a network, the apparatus comprising:

a means for receiving a request from a remote method call on a client system;

a means for allocating system resources to the remote method associated with the server system;

a means for invoking the remote method associated with the server system;

a means for determining an availability of general resources required for processing the remote method; and a means for suspending the remote method from further processing when the remote method depends on a general resource which is not available, including:

a means for relinquishing system resources and general resources to the server system, a means for blocking the remote method from further processing until the resource which was not available is released and made available to the remote method, and a means for providing an execution state and a remote procedure call (RPC) state associated with the remote method call to continue processing the remote method at a subsequent time period.

37. The apparatus of claim 36 further comprising a client system operatively coupled to the server system.

38. An apparatus coupled to a server system for enabling a previously suspended remote method to continue processing on the server system and generate a result for a client application on a client system which is operatively coupled to the server system over a network, wherein the server system stores an execution state and a remote procedure call (RPC) state associated with the remote method call to continue processing the remote method at a subsequent time period, the apparatus comprising the steps of:

a means for receiving indication that a continuation event associated with a suspended remote method has occurred;

a means for allocating system resources and general resources to the remote method in preparation to continue processing:

a means for continuing execution of the remote method utilizing the allocated resources;

a means for generating results from the remote method; and a means for transmitting the results from the server system to the client application on the client system.

39. The apparatus of claim 38 further comprising a client system operatively coupled to the server system.

* * * * *

UNITED STATES PATENT AND TRADEMARK OFFICE
CERTIFICATE OF CORRECTION

PATENT NO.    : 6,237,024 B1  
DATED         : May 22, 2001  
INVENTOR(S)   : Ann M. Wollrath et al.

It is certified that error appears in the above-identified patent and that said Letters Patent is hereby corrected as shown below:

Column 15, claim 19,
Line 46, "where in" should read -- wherein --.

Signed and Sealed this

Fifth Day of March, 2002

JAMES E. ROGAN  
*Director of the United States Patent and Trademark Office*

*Attest:*

*Attesting Officer*

UNITED STATES PATENT AND TRADEMARK OFFICE
CERTIFICATE OF CORRECTION

PATENT NO. : 6,237,024 B1
DATED : May 22, 2001
INVENTOR(S) : Ann M. Wollrath et al.

It is certified that error appears in the above-identified patent and that said Letters Patent is hereby corrected as shown below:

<u>Title page,</u>
Item [73], "Microsystem" should read -- Microsystems --.

Signed and Sealed this

Seventeenth Day of December, 2002

JAMES E. ROGAN
*Director of the United States Patent and Trademark Office*